United States Patent Office 3,459,560
Patented Aug. 5, 1969

3,459,560
SINGLE-STAGE ANGEL FOOD CAKES
Richard A. Shea, St. Louis Park, Minn., assignor to The Pillsbury Company, Minneapolis, Minn., a corporation of Delaware
No Drawing. Filed Feb. 7, 1966, Ser. No. 525,354
Int. Cl. A21d 13/08
U.S. Cl. 99—92          13 Claims

ABSTRACT OF THE DISCLOSURE

Single-stage chemically leavened angle food cake dry mixes which do not necessitate a recipe beating step are obtained by the utilization of hydrophilic film formers and a leavening acid having a neutralization value of at least 100 as mix ingredients. The leavening acid is present in the mix in an amount sufficient to neutralize at least 90 percent of the leavening base. In combination with leavening acid an effective amount of hydrophilic film former sufficient to provide a viscous batter and entrap the carbon dioxide produced by the leavening system is employed.

---

This invention relates to cakes. More particularly, the present invention relates to angel food cakes, cake mixes therefor and the method of preparing the same.

It is an object of the present invention to provide a simple angel food cake mix and easy method of preparing angel food cakes therefrom.

Another object of the present invention is to provide an angel food cake mix that is simple to blend and bake.

A further object of the invention is to provide a single package angel food cake mix.

Still a further object of the invention is to provide angel food cakes of superior characteristics.

Heretofore, angel food cakes have been prepared either by the two-stage, hand-fold method, the one-stage chemical leavened system, or what is known to the art as the two-stage machine fold method.

Two-stage, hand-fold angel food cakes are prepared in general without chemical leavening by whipping a quantity of egg whites into a stiff foam and then folding into the egg white foam other dry angel food cake ingredients such as flour, sugar and flavoring. Formation of the stiff egg white foam necessitates blending at low speed for about two minutes followed by whipping of the egg whites at a high speed for about five minutes. Extreme care is required to insure that the foamed egg white structure is not broken during the folding step. Due to the sensitivity of the two-stage method, reproducibility of angel food cakes having the necessary volume, cake grain, texture, symmetry, and tenderness is difficult to achieve. In general, angel food cakes prepared by such a method have a cake grain of small closed cells with large air pockets as a result of nonuniform dispersion of air throughout the egg whites during whipping and formation of the foam. These cakes are not resilient (i.e., upon compression and release of compression, the individual cells throughout the cake fail to resume their original configuration).

The machine-fold two-stage method of preparing angel food cakes is substantially the same as the hand-fold method with the exception that a small amount of a chemical leavening composition is present in the dry ingredients added during the folding step to counteract the loss in volume caused by breakdown of the foam. Angel food cakes prepared by the machine-fold method have several adverse properties such as toughness, lack of moisture, and unsymmetrical appearance and a great degree of nonresiliency. The crust is tough with pronounced valleys and ridges.

Single-stage, chemically leavened angel food cake mixes and the method of preparing angel food cakes therefrom are disclosed in U.S. Patent 3,038,808 by Perrozzi et al. In general, Perrozzi et al. discloses admixing flour, sugar, egg whites (and water of hydration if dried egg whites are used) and leavening composition; agitating the admixture to blend the cake ingredients in the aqueous medium and terminating the agitation prior to the development of an observable foaming of the egg whites and then baking the blended product. A typical blending step comprises mixing at a low speed with a standard household mixer for 30 seconds and then at half speed for an additional 2½ minutes followed by baking. In such a method, greater reliance is placed upon the heat applied during the baking step to provide the reaction between the leavening base and leavening acid composition.

According to the present invention, there is provided a single-stage chemically leavened angel food cake mix adapted to provide an angel food cake batter when said mix is reconstituted with an aqueous medium; said batter having sufficient viscosity to entrap the carbon dioxide provided by the chemical leavening system; said mix containing at least one water-soluble leavening acid in an amount sufficient to react with a major portion of leavening base contained in the mix without the application of external heat, said mix being further characterized by providing viscous batter of at least a 100 percent increase in angel food cake batter volume when said mix is reconstituted with an aqueous medium and mixed in a standard mixing bowl with a standard household mixer operated at 350 r.p.m. for 60 seconds.

An illustrative single-stage chemically leavened angel food cake mix contemplated by the present invention comprises:

(1) farinaceous material,
(2) sugar,
(3) a chemical leavening base, and
(4) at least one water-soluble leavening acid having a neutralization value of at least 100; said leavening acid being present in an amount sufficient to neutralize at least 90 percent of the leavening base contained in said mix, said mix being further characterized by providing a viscous batter of at least a 100 percent increase in batter volume when said mix is reconstituted with an aqueous medium containing egg albumen and mixed in a standard mixing bowl with a standard household mixer operated at 350 r.p.m. for 60 seconds.

Farinaceous material employable in the angel food cake mixes include mixtures of flour and starch. Large amounts of starch may be substituted for the flour, provided the farinaceous material contains sufficient wheat protein. Suitable farinaceous material employable herein is a mixture of starch and flour ranging from about 20 to about 80 weight percent starch. Broadly, the range of farinaceous material, depending upon the nature of the farinaceous material, would encompass from about 10 to about 28 parts by weight of farinaceous material per 48 parts by weight of sugar; said sugar being based upon the total amount of sugar solids contained in the viscous cake batter immediately prior to the baking thereof. Advantageously provided are those angel food cakes and cake mixes having from about 16 to about 24 parts of farinaceous material per 48 parts by weight of sugar with an amount of about 20 parts by weight of farinaceous material to about 48 parts by weight of sugar being preferred.

Unexpectedly superior results are achieved by employing as part of the farinaceous material a hard weight flour having a protein content greater than soft wheat flours conventionally employed in angel food cake mixes. Based upon 48 parts by weight sugar and a hard weight protein content of about 7 weight percent of the total flour dry weight, it has been found that when about 60 weight percent of the farinaceous material consists of a hard wheat flour, such results are achieved. An illustrative hard wheat flour is a dry bleached hard wheat flour containing about 6.5 to about 7.5 weight percent of wheat protein and having obtained by air classification as disclosed in U.S. Patent 3,077,308 by Rozsa et al. a particle distribution in Stokes Equivalent Diameter Units (S.E.D. Units) as set forth in Example I.

In order to provide a foamed viscous batter, it is desirable to provide in the angel food cake mix a sufficient amount of gelatinized starch to enhance the gas retention ability of the batter during the batter mixing. Upon reconstitution with an aqueous medium, the gelatinized starch absorbs water and provides a paste or gel characteristic upon the addition of cold water (e.g., 20° C.) whereas ungelatinized or raw starches are relatively insoluble in a cold aqueous system and merely disperse therein to form slurries. Any suitable edible gelatinized starch may be employed such as corn, high amylose corn, wheat, oat, potato, waxy maize, tapioca, sorghum, sago, rice, arrowroot starches, mixtures thereof and the like. Modified and unmodified gelatinized starches may be employed. The modified gelatinized starches include raw starches which have been modified via oxidation, acid hydrolysis or esterification and then cooked. A gelatinized starch having a particle size finer than #80 U.S. Standard mesh is generally employed since starches of such particle size provide easy dispersion of the mix into the liquid used to rehydrate the angel food cake ingredients. In general, up to about 4 parts by weight (based on 48 parts by weight sugar) of gelatinized starches may be employed. Advantageously, from about 0.25 to about 3.0 parts by weight starch is employed with a preferred range of about 1.0 to about 2.0 parts by weight.

Typical sugars include any of the common granular sugars such as sucrose, dextrose, maltose, lactose, and invert sugars. The sugar may be included within the cake mix or may be added by the homemaker during the batter mixing step.

In general, the egg albumen solids, whether in the dry or hydrated form, ranges from about 5 to about 16 parts by weight of solid egg albumen per 48 parts by weight of sugar. Advantageously, the amount of egg albumen ranges from about 6 to about 11 parts by weight with about 8 parts by weight to about 48 parts by weight of sugar being preferred. When dehydrated egg albumen solids are included in the single-stage chemically leavened angel food cake mix, the egg solids are provided in a form which permits the rapid hydration thereof in the cake batter. Rapid hydration of the egg albumen may be accomplished by the employment of spray-dried sugar albumen particulates containing about 33 weight percent sugar. In preparing batters with cake mixes containing dried egg whites, sufficient water is added to reconstitute the egg whites (usually about 650±100 weight percent of the total dried egg white weight).

Various other tasteless water-soluble food thickening agents which provide a viscous medium in combination with the angel food cake ingredients contained in the cake batter can be employed provided such agents do not adversely depress the ultimate cake volume or decompose during the baking step. Typical thickening agents include the edible water-soluble film formers such as gelatinized starch, gum arabic, dextrin, casein, sodium caseinate, carboxymethylcellulose, gum karaya, gum tragacanth, locust bean gums, sodium alginates, methylated guar gum, hydrolyzed soy protein, mixtures thereof and the like. Exceptional performance (e.g., greater cake volume) is accomplished by utilization of gum arabic in amounts up to about 1 part by weight and preferably from about 0.2 to 0.5 part by weight. It has been found that the gum arabic may be employed as an egg albumen replacement in amounts up to 7 weight percent.

The leavening composition of the single-stage chemically leavened angel food cake mix consists essentially of a leavening base such as sodium bicarbonate and a leavening acid composition.

The leavening acid composition should contain a molar excess of leavening acid in order to avoid an undesirable cake color and bitter taste. In general, the amount of leavening acid employed herein should be sufficient to provide a baked cake having a pH of less than 7 and advantageously more than 4 wherein the pH is ascertained by dispersing 18 grams of finely divided cake crumbs in 100 ml. of water. Based upon about 48 parts by weight of sugar, an exemplary single-stage chemically leavened angel food cake mix will contain from about 1 part by weight to about 9 parts by weight of chemical leavening. Advantageously, the amount of chemical leavening in a single-stage cake mix ranges from about 1.5 to about 4.5 parts by weight with an amount of about 3.5 parts by weight per 48 parts by weight of sugar being the preferred amount.

The leavening acid composition contains at least one water-soluble leavening acid having a neutralization value of at least 100. Exceptional performance is obtained by the employment of those acids which have a neutralization value in excess of 110. Illustrative leavening acids and the neutralization values thereof include the following acids and mixtures thereof:

| Acid: | Neutralization value |
| --- | --- |
| Fumaric acid | 145 |
| Citric acid | 131 |
| Adipic acid | 125 |
| Tartaric acid | 120 |
| Sodium aluminum phosphate | 100 |

The amount of leavening acid having a neutralization of at least 100 provided in the single-stage chemically leavened angel food cake mix is sufficient to neutralize at about 90 percent of the leavening base contained in the cake mix and generally has a neutralization power ranging from about 0.9 to 1.1 per 1.0 gram of the leavening base ultimately provided in the angel food cake batter.

In addition to having a neutralization value of at least 100, it is essential that the acid readily disperse in the angel food cake batter and have a rate of activity sufficient to neutralize at least 90 percent of the leavening base when the angel food cake batter is mixed 45–90 seconds in a standard mixing bowl with a standard household mixer operated at 350 r.p.m. at 20° C. Thus relatively insoluble leavening acids such as fumaric acid are physically altered to provide an acid which is readily soluble in the cake batter and possesses a fast rate of activity with the leavening base. Accordingly, fumaric acid particulates which have been ground to a particle size of less than 60 microns have been found to possess the necessary solubility and rate of activity in the instant cake mixes. Another satisfactory fumaric acid product employable herein may be obtained by spray-drying an aqueous medium of 50 percent solids content which consists essentially of about 50 percent by weight lactose and 50 percent by weight fumaric acid in a slurry form.

Additional supplemental leavening acids which have a neutralization value of less than 100, providing a minor portion of the leavening acid composition, may be included in the instant cake mixes. Illustrative supplemental leavening acids include glucono delta lactone, cream of tartar, monocalcium phosphate monohydrate, anhydrous coated monocalcium phosphate, sodium acid pyrophosphate monosodium phosphate, dicalcium phosphate, mixtures thereof and the like. Superior baked angel food cakes are provided by the inclusion of cream of tartar in the cake mix in amounts ranging from about 0.4 to about 1.0 part by weight per 48 parts by weight sugar.

Various flavoring agents conventionally added to cake mixes are adaptable herein. Exemplary flavors include cherry, lemon, lime, and various other artificial flavorings. Sweetness of the cake may be increased by artificial sweeteners such as saccharine and the cyclamate salts.

An exemplary single-stage angel food cake mix with chemical leavening composition comprises:

(a) about 16 to about 24 parts by weight farinaceous material comprising wheat flour and containing from about 30 to about 60 weight percent starch,
(b) about 48 parts by weight sugar,
(c) about 6 to about 11 parts by weight of egg albumen,
(d) about 1.4 to about 1.8 parts by weight chemical leavening base, and
(e) at least one water-soluble leavening acid having a neutralization value of at least 100 in an amount sufficient to neutralize at least 90 percent of the leavening base.

Unless expressly indicated otherwise, the recitation parts by weight is based upon the relative proportions of farinaceous material, sugar, egg albumen solids, chemical leavening and gum arabic when employed in the culinary product on a dry basis immediately prior to the baking thereof. The recitation is intended to exclude various other conventionally added angel food cake additives, notwithstanding the employment of such additives, such as flavoring, salt, artificial sweetener, etc. which are usually added in small amounts.

The following examples are illustrative of the present invention:

Example I

A series of angel food cakes, standard size and volume, were produced from a premix comprising the following components and proportions:

| Ingredients: | Ounces |
|---|---|
| Farinaceous material | 220 |
|     Starch | 90 |
|     Gelatinized starch | 2 |
|     Hard wheat flour [1] | 128 |
| Sugar (sucrose) | 561.1 |
| Citric acid | 6.2 |
| Fumaric acid (60 micron size) | 9.0 |
| Sodium bicarbonate | 20.9 |
| Egg alubmen [2] (spray-dried sugar-alubumen) (1:2 ratio) | 151.8 |
| Gum arabic | 3.5 |
| Vanilla flavoring | 2.5 |
| Cream of tartar | 7.0 |

[1] A bleached dry, hard wheat flour obtained via air classification, a protein content of 7 weight percent and having the following S.E.D.:

| Micron size: | Percent finer than— |
|---|---|
| 100 | 100 |
| 80 | 98.7 |
| 60 | 96.1 |
| 40 | 84.4 |
| 30 | 67.5 |
| 20 | 27.2 |
| 10 | 2.6 |
| 5 | 0 |

[2] Spray-dried particulate obtained by the spray-drying of an aqueous medium of 50 percent by weight solids consisting of 1 part by weight sucrose and 2 parts by weight egg albumen solids.

To a series of 15.5-ounce aliquots of the above composition there was added one and one-quarter cups of water. The cake mixes were then blended with a Sunbeam household mixer at a low speed (350 r.p.m.) for one minute in a standard mixing bowl after which the resultant viscous batters were poured into standard angel food cake pans and baked at 350° F. for 40 minutes. It was observed that prior to the formation of a viscous homogenous cake batter (i.e., prior commencement of the blending step) that the volume of the aqueous medium and 15.5-ounce aliquots was about 4 cups. After completion of the one-minute blend, a homogenous foamed viscous batter was produced having a volume equivalent to 11 cups of water. Volume between the baked cakes was uniform with in-pan volumes of 130±8 mm. and out-pan volumes of 120±8. The cakes were symmetrical in appearance. The cell walls were thin and easily severed. Moisture content of the cakes was high. Upon compression and release of compression, the cell structures returned to their original shape and configuration. Cake texture was smooth, silky and free from hardness and lumps. The cakes thus prepared had an excellent taste. No failures or near failures were observed.

Example II

A series of angel food cakes, standard size and volume, were produced from a premix comprising the following completion of the one-minute blend, a homogenous

| Ingredients: | Ounces |
|---|---|
| Farinaceous material | 218 |
|     Starch | 90 |
|     Hard wheat flour [3] | 128 |
| Sugar (sucrose) | 561.1 |
| Sugared egg albumen [4] | 151.8 |
| Citric acid | 6.2 |
| Spray-dried fumaric acid-lactose (1:1 weight ratio) | 18 |
| Sodium bicarbonate | 20.9 |
| Salt | 3 |
| Gum arabic | 3.5 |
| Vanilla flavoring | 5 |
| Cream of tartar | 7 |

[3] Supra, see footnote 1, column 5, lines 58 and 59.
[4] Supra, see footnote 2, column 5, lines 66–68.

To a series of 16-ounce aliquots of the above composition there was added one and one-quarter cups of water. The cake mixes were then blended with a Sunbeam household mixer at a low speed (350 r.p.m) for one minute in a standard mixing bowl after which the resultant viscous batters were poured into standard angel food cake pans and baked at 350° F. for 40 minutes. It was observed that prior to the formation of a viscous homogenous cake batter (i.e., prior commencement of the blending step) that the volume of the aqueous medium and 16-ounce aliquots was about 4 cups. After completion of the one-minute blend, a homogenous foamed viscous batter was produced having a volume equivalent to 11 cups of water. Volume between the baked cakes was uniform with in-pan volumes of 130±8 mm. and out-pan volumes of 120±8 mm. The cakes were symmetrical in appearance. The cell walls were thin and easily severed. Moisture content was slightly less than the cakes prepared according to Example I. Cake texture was smooth and free from hardness and lumps. The cakes thus prepared had an excellent taste. No failures or near failures were observed.

Example III

A series of angel food cakes were prepared employing a premix composition identical to that employed in Example II with the exception that it contained no dry egg whites. To each 14.4-ounce aliquot thereof there was added 13 medium size grade-A fresh egg whites (approximately 14.6 oz.) and the resulting compositions were then blended for 90 seconds with a household mixer operated at a low speed. The batter thus prepared was for 40 minutes at 350° F. Baked cake products similar to poured into standard angel food cake pans and baked those observed in Example II were achieved.

Example IV

A series of partial angel food cake mixes were prepared by admixing the following ingredients and amounts thereof.

Ingredients: Grams

Farinaceous material _____ 989.7

Starch _____ 408.6
        What flour [5] _____ 581.1

Spray-dried fumaric acid-lactose (1:1 weight ratio) _____ 81.7
    Sodium bicarbonate _____ 94.9
    Citric acid _____ 28.1
    Egg albumen (spray-dried sugar-albumen) (1:2 ratio) _____ 689.2
    Gum arabic _____ 15.9
    Almond flavoring _____ 5.4
    Cream of tartar _____ 31.8
    Vanilla _____ 34.1

[5] Supra, see footnote 1, column 5, lines 58 and 59.

Employing the same procedure as disclosed in Example II, ten 7-ounce portions of the above cake mix composition were prepared. To each portion there was added one and one-quarter cups of water and 9 ounces of sugar and the mixture thereof was blended for one and one-half minutes to form a homogenous batter. The batter was then baked at 350° F. for 40 minutes. Results similar to those observed in Example II were achieved.

Example V

A partial angel food cake mix comprising the following ingredients and amounts thereof was prepared.

Ingredients: Grams

Farinaceous material _____ 1185

Starch _____ 465
        Wheat flour [6] _____ 720

Fumaric acid (60 micron size) (chemical leavening acid) _____ 65.0
    Sodium bicarbonate (leavening base) ____ 94.9
    Cream of tartar _____ 35

[6] Supra, see footnote 1, column 5, lines 58 and 59.

To ten 4.9-ounce portions of the above composition there was added 13 medium size grade-A fresh egg whites, 1 tablespoon of vanilla flavoring and one and one-quarter cups of sugar mixed to make batter and baked in a manner similar to Example I. Results were similar to those obtained in Example II.

The leavening acids disclosed in the Examples I–V may be substituted with other acids having a neutralization value of at least 100 other than fumaric and citric acids in appropriate amounts depending upon the solubility and neutralizing effects thereof. Similarly, two pouches such as one containing the leavening acid and the other the leavening base along with other angel food cake mix ingredients may be employed. Various other modifications such as sugars, farinaceous materials, flavorings, etc. should be readily apparent to those skilled in the art.

Moreover, the cakes prepared according to the above-mentioned cake mixes and method for preparing the same may be prepared by various other methods such as merely blending said mixes by hand for a period of time equivalent, for example, to a standard household mixer operated at 350 r.p.m. for a period of time ranging from about 45 to 90 seconds.

What is claimed is:

1. A single-stage chemically leavened angel food cake mix comprising:
  (a) farinaceous material in an amount ranging from about 10 to about 28 parts by weight,
  (b) 48 parts by weight sugar,
  (c) a chemical leavening base,
  (d) at least one water-soluble leavening acid having a neutralization value of at least 100, said leavening acid being present in an amount sufficient to neutralize at least 90 percent of the leavening base contained in said mix, and
  (e) gelatinized starch in an amount sufficient to enhance the gas retention ability of the reconstituted mix during the formation of a batter.

said mix being further characterized by providing a viscous angel food cake batter of at least 100 percent increase in volume when said mix is reconstituted with an aqueous medium containing egg albumen, and mixed in a standard mixing bowl with a standard household mixer operated at 350 r.p.m. for 60 seconds.

2. The mix according to claim 1 wherein the farinaceous material comprises starch and wheat flour, said starch comprising from about 20 to about 80 weight percent of the farinaceous material.

3. The mix according to claim 2 wherein the total amount of leavening acid and leavening base contained therein range from about 1 to about 9 parts by weight.

4. The mix according to claim 3 wherein the total amount of leavening acid and leavening base contained in the mix range from about 2 to about 7 parts by weight and from about 16 to about 24 parts by weight farinaceous material.

5. The mix according to claim 3 wherein the mix contains dry egg albumen in an amount ranging from about 5 to about 16 parts by weight.

6. The mix according to claim 5 wherein the mix contains another film forming agent in addition to the gelatinized starch with the total amount of film forming agent therein ranging up to about 4 parts by weight.

7. The mix according to claim 3 consisting essentially of about 16 to about 24 parts farinaceous material, about 1.5 to about 4.5 parts by weight chemical leavening acid and leavening base, about 0.25 to about 4.0 parts by weight of a water-soluble film forming agent including gelatinized starch and at least one additional film forming agent, 48 parts by weight of sugar and from about 6 to about 11 parts by weight of dry egg albumen solids.

8. The mix according to claim 7 wherein the additional film forming agent is gum arabic in an amount ranging from about 0.2 to about 0.5 part by weight.

9. The mix according to claim 7 wherein the amount of gelatinized starch ranges from about 1 to about 2 parts by weight.

10. The mix according to claim 7 consisting essentially of about 20 parts by weight farinaceous material, said farinaceous material comprising a hard wheat flour having a protein content greater than 6 weight percent and from about 30 to about 60 weight percent added free starch not derived from the flour, 48 parts by weight sugar, about 8 parts by weight egg albumen, about 3.5 parts by weight water-soluble chemical leavening acid and leavening base, said leavening acid consisting essentially of a water-soluble leavening acid having a neutralization value of at least 120 and a supplemental leavening acid having a neutralization value of less than 100, said leavening acid being present in an amount sufficient to provide a baked cake having a pH of less than 7 but greater than 4 when 18 grams of finely divided baked cake crumbs are dispersed in 100 ml. of water.

11. The mix according to claim 10 having a water-soluble film forming agent of gelatinized starch and gum arabic, the leavening acid consists essentially of fumaric acid, citric acid and cream of tartar; the leavening base is sodium bicarbonate and the hard wheat flour is obtained by air classification and is further characterized by having a protein content ranging from about 6.5 to about 7.5 weight percent and having the following particle distribution range in S.E.D. Units:

| Micron size: | Percent finer than— |
|---|---|
| 100 | 100 |
| 80 | 98.7 |
| 60 | 96.1 |
| 40 | 84.4 |
| 30 | 67.5 |
| 20 | 27.2 |
| 10 | 2.6 |
| 5 | 0 |

12. The method of making an angel food cake, said method comprising:

(a) admixing an aqueous medium containing 10 to 28 parts by weight farinaceous material, 48 parts by weight sugar, about 5 to about 16 parts by weight egg albumen solids, gelatinized starch in an amount ranging from about 0.25 to about 4 parts by weight, from about 1 to about 9 parts by weight chemical leavening composition, said chemical leavening composition consisting essentially of leavening acid and leavening base, said leavening acid consisting essentially of at least one leavening acid having a neutralization value of at least 100 and present in an amount sufficient to neutralize at least 90 percent of the leavening base, (b) agitating said admixture for a period of time sufficient to provide a homogeneous viscous foamed angel food cake batter, (c) terminating said agitation when said batter has a volume of at least 100 percent greater than that initially provided by the aqueous medium, (d) baking said batter.

13. The method according to claim 12 whereby said agitation is terminated upon at least a 150 percent increase in volume over that initially provided by the aqueous medium and the amount of gelatinized starch in the admixture ranges from about 1 to about 2 parts by weight.

References Cited

UNITED STATES PATENTS

| 2,929,715 | 3/1960 | Sutton. | |
| 3,038,808 | 6/1962 | Perrozzi et al. | 99—94 XR |
| 3,078,168 | 2/1963 | Bedenk | 99—94 |

RAYMOND N. JONES, Primary Examiner

J. R. HOFFMAN, Assistant Examiner

U.S. Cl. X.R.

99—94